United States Patent

Shaum et al.

Patent Number: 5,815,593
Date of Patent: Sep. 29, 1998

[54] LASER SURFACE CHARACTERISTIC MEASURING

[75] Inventors: Loren E. Shaum, Syracuse; Steven J. Remis, South Bend, both of Ind.; Allen K. McVay, Edwardsburg, Mich.

[73] Assignee: SMI Technology, LLC, Elkhart, Ind.

[21] Appl. No.: 544,403

[22] Filed: Oct. 10, 1995

[51] Int. Cl.$^6$ .................................................. G06K 9/00
[52] U.S. Cl. ........................... 382/154; 382/108; 348/47; 348/92; 348/128
[58] Field of Search ...................................... 382/154, 108, 382/141, 143, 151, 152, 184, 217, 218, 286, 289; 348/42, 47, 86, 92, 93, 94, 95, 124, 125, 128, 130; 364/420, 491; 250/223 B, 559.39, 559.46; 3561/237, 376, 394, 396; 29/729, 739

[56] References Cited

U.S. PATENT DOCUMENTS

| 4,326,808 | 4/1982 | Pryor et al. | 348/128 |
| 4,618,938 | 10/1986 | Sandland et al. | 382/149 |
| 4,783,826 | 11/1988 | Koso | 382/151 |
| 4,929,893 | 5/1990 | Sato et al. | 382/151 |
| 5,118,192 | 6/1992 | Chen et al. | 356/376 |
| 5,544,256 | 8/1996 | Brecher et al. | 382/149 |
| 5,638,461 | 6/1997 | Fridge | 382/154 |

*Primary Examiner*—Christopher C. Kelley
*Attorney, Agent, or Firm*—Van Dyke, Gardner, Linn & Burkhart, LLP

[57] ABSTRACT

A high speed method and apparatus for accepting and rejecting an object by identifying specific surface features of interest of an object includes providing at least one non-contact sensor capable of measuring a characteristic of a surface and a transporter system for creating relative motion between the sensor and an object while repetitively making measurements of a surface of the object with multiple readings being taken with the sensor at each of multiple locations in order to create a data set. A data analysis system mathematically processes the surface characteristic data and positional data into surface feature data which represents three-dimensional surface features of the object. The data analysis system correlates the surface feature data with data representative of ideal surface features of an object in order to determine an amount of deviation of the measured surface feature data from data representative of ideal surface features to accept or reject the object by determining whether the amount of deviation is within a provided limit.

21 Claims, 6 Drawing Sheets

LASER SURFACE CHARACTERISTIC MEASURING

BACKGROUND OF THE INVENTION

This invention relates generally to measuring the surface characteristics of an object and, more particularly, to using a non-contact sensor for making measurements. More particularly, the invention relates to the inspection of objects in order to determine whether the object is within acceptable manufacturing tolerances.

In order to provide very high quality manufactured objects, or parts, which will have a low failure rate in application, it is desirable to perform an inspection of a large number of the manufactured parts in order to determine if the parts are within acceptable manufacturing tolerances. The greater the number of parts inspected, and the more detailed the inspection, the higher the level of confidence in part conformity to specifications. Where parts are produced rapidly in great volume, exceptional speed of inspection is required in order to inspect a significantly representative sample of the production run. However, a short cycle time for component inspection has, in the past, prevented all but a superficial inspection of each inspected part. Serious defects often have gone undetected, which as resulted in failures of the parts in use.

Non-contact sensor technology, particularly technology employing light patterns reflected from the surface of an object, has many advantages because the object can be inspected without a mechanical probe contacting the surface of the object. However, such non-contact systems utilizing reflective light may be affected by particular characteristics of the object. Most notable is the color of the surface of the object. Objects having multiple color surfaces, or objects which come in various colors, have proven very difficult to inspect using reflected light because of variations introduced by color. Therefore, the use of reflected light to perform inspection of parts, which are produced according to various color schemes, has eluded commercial application.

An additional difficulty with a high volume precision inspection of objects has been orienting of the part with respect to the sensing apparatus. This is particularly difficult for components having surface features which are not readily identifiable, such as the beginning or end of a spiral thread.

The long-felt need for a high speed, high accuracy, inspection technique, which is capable of detecting minute defects irrespective of location on the parts' surface, has not been satisfied prior to the present invention.

SUMMARY OF THE INVENTION

The present invention provides a high speed method of measuring surface characteristics of an object which overcomes the limitations of the prior art. A method according to the invention includes providing at least one non-contact sensor which is capable of measuring a characteristic of a surface at at least one location. Relative motion is created between the sensor and the object while repetitively making measurements of the surface characteristic in order to create a data set. A subset of data that represents specific surface features of the object is extracted from the data set and correlated with a set of relevant surface feature data, which represents an acceptable object. As a result of the correlation, the object is either accepted or rejected. The amount of data collected results in a detailed and very finite division between acceptance and rejection criteria, as defined by the subset of data.

According to an additional aspect of the invention, prior to performing the steps leading up to accepting or rejecting of the object, a very finite measurement of the orientation of the object is made and the object reoriented in response to the measurement. The orientation may be measured by creating a data set in the manner previously set forth, extracting from the data set a subset of data that represents surface features of the object, and correlating this subset of data with a set of relative surface feature data. This provides a technique for identifying specific surface features which allow the orientation of the object to be inferred.

A high speed non-contact surface character, or feature, measurement apparatus according to the invention includes at least one non-contact sensor which is capable of measuring a characteristic of a surface at at least one location and a transporter for causing relative motion between the sensor and an object. A high speed data acquisition is provided for making multiple readings from the sensor at each of multiple locations on an object in order to provide surface characteristic data. A data analysis system is provided which receives the surface character data from the data acquisition system and positional data from the transporter in order to produce data that represents surface features of the object. The data analysis system further includes correlating means for correlating this data with data which represents surface features of the object and means for accepting or rejecting the object in response to the correlating means.

The transporter, the high speed data acquisition system, and the data analysis system are each locally controlled and coordinated through motion commands communicated through a communication subsystem. This provides for rapid assessment of the surface characteristics of the object in order to provide an exceptionally short cycle time duration for a part inspection. Furthermore, the inspection that is performed is exceptionally detailed, encompassing all areas of interest of the surface. Furthermore, the invention provides such rapid and detailed inspection of parts of exceptional complexity which heretofore have eluded automated inspection.

These and other objects, advantages, and features of this invention will become apparent upon review of the following specification in conjunction with the drawings.

DESCRIPTION OF THE PREFERRED EMBODIMENT

Figure 1:
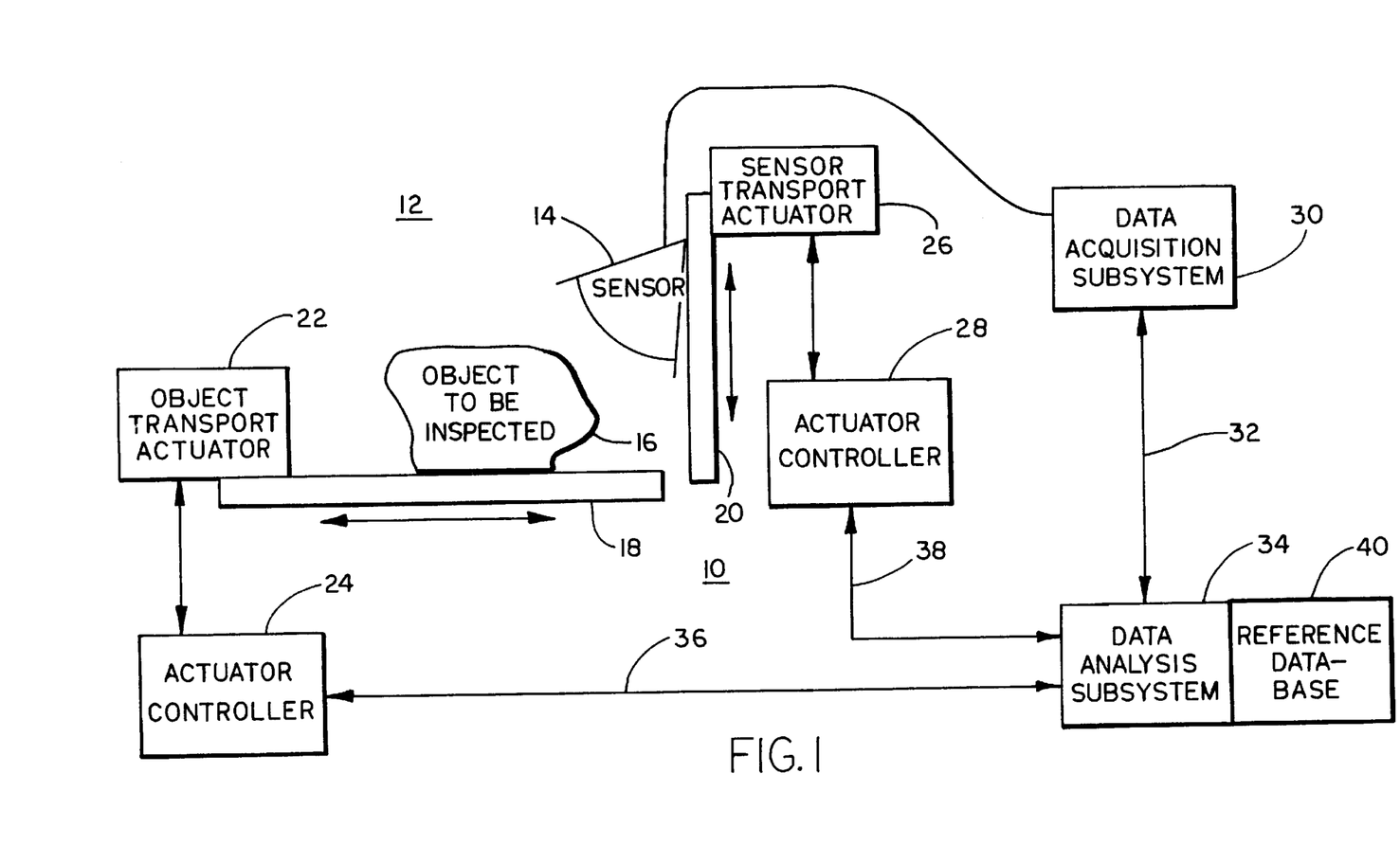
FIG. 1 is a block diagram of a surface character measurement apparatus according to the invention.

Referring now specifically to the drawings, and the illustrative embodiments depicted therein, a high speed surface character measurement apparatus 10 includes a transport system 12 for creating relative motion between a sensor, or sensors, 14 and an object to be inspected 16 (FIG. 1). Transport system 12 may include a first transporter 18 for moving object 16 and a second transporter 20 for creating motion in sensor 14. It is to be understood that, depending upon the application, one transporter for either the object or the sensor may be sufficient. In other applications, it may be desirable to create multi-directional motion in both the object and the sensor. The motion created by each transporter 18, 20 may be linear motion in one axis, linear motion in two or more axes, rotational motion, or a combination of these or other motions. Transport system 12 additionally includes an object transport actuator 22 for moving transporter 18 in response to commands from an actuator controller 24. Transporter system 12 additionally includes a sensor transport actuator 26, for moving transporter 20, in response to commands from an actuator controller 28.

Measurement apparatus 10 additionally includes a data acquisition subsystem 30 which provides high speed data-gathering of the output of sensor 14. A communication subsystem 32 provides communication between data acquisition subsystem 30 and a data analysis subsystem 34. Other communication subsystems 36 and 38 provide communication, respectively, between data analysis subsystem 34 and actuator controller 24 and between data analysis subsystem 34 and actuator controller 28. Data analysis subsystem 34 includes a reference database 40 made up of data of acceptable part surface characteristics. Reference database 40 can be made up of data of an acceptable part by either empirical techniques, such as measuring an acceptable part, or by analytical techniques, such as taking appropriate dimensions off a part layout drawing or other techniques as would be apparent to those skilled in the art.

In the illustrated embodiment, object transport actuators 22, 26 are servo motors having encoders that provide positional feedback on lines 42, 44, respectively, to actuator controllers 24, 28. Alternatively, actuators 22, 26 may be precision stepper motors which do not require positional feedback in order to provide information regarding the position of the respective transporters 18, 20. Actuators 22, 26 could also be implemented using hydraulic or pneumatic positioning devices or robotic positioning devices. In the illustrated embodiment, actuator controller 24, 26 is a motion controller manufactured by Berkeley Process Control of Richmond, Calif. Series –32 or Series –64 Berkeley Axis Machine (BAM) Controller.

Figure 2:
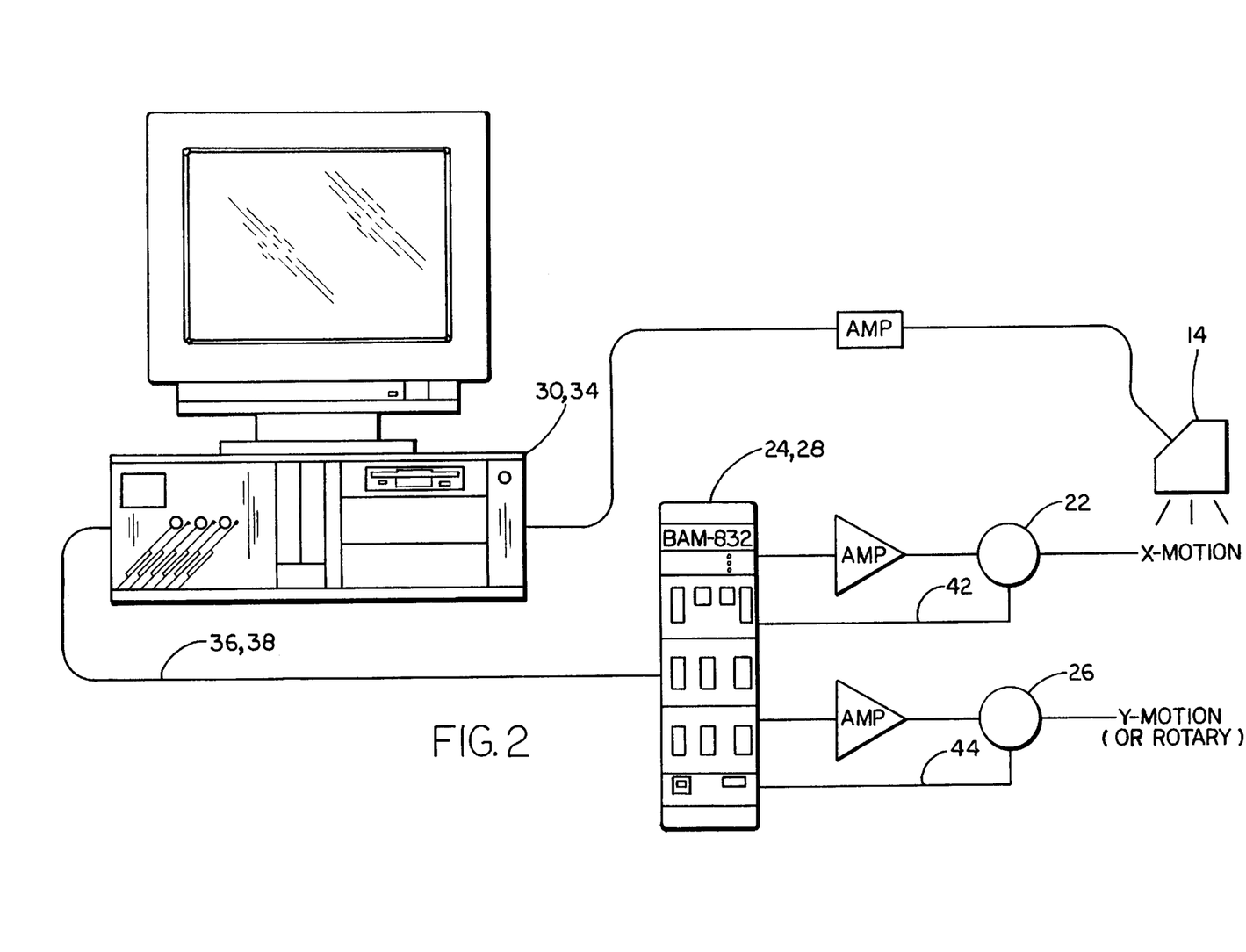
FIG. 2 is a block diagram of an electrical interconnection of the apparatus in FIG. 1.

In the illustrative embodiment, data acquisition subsystem 30 is an eight-channel, 16-bit extremely high-speed data translation board, which is slot-compatible with an IBM compatible personal computer, as illustrated in FIG. 2. Such data translation board is manufactured by Data Translation under Model No. DT3801-G and is capable of making more than 30,000 measurements in a six-second period using data from two sensors 14. Data acquisition subsystem 30 can accommodate up to eight (8) sensors.

Figures 3, 4:
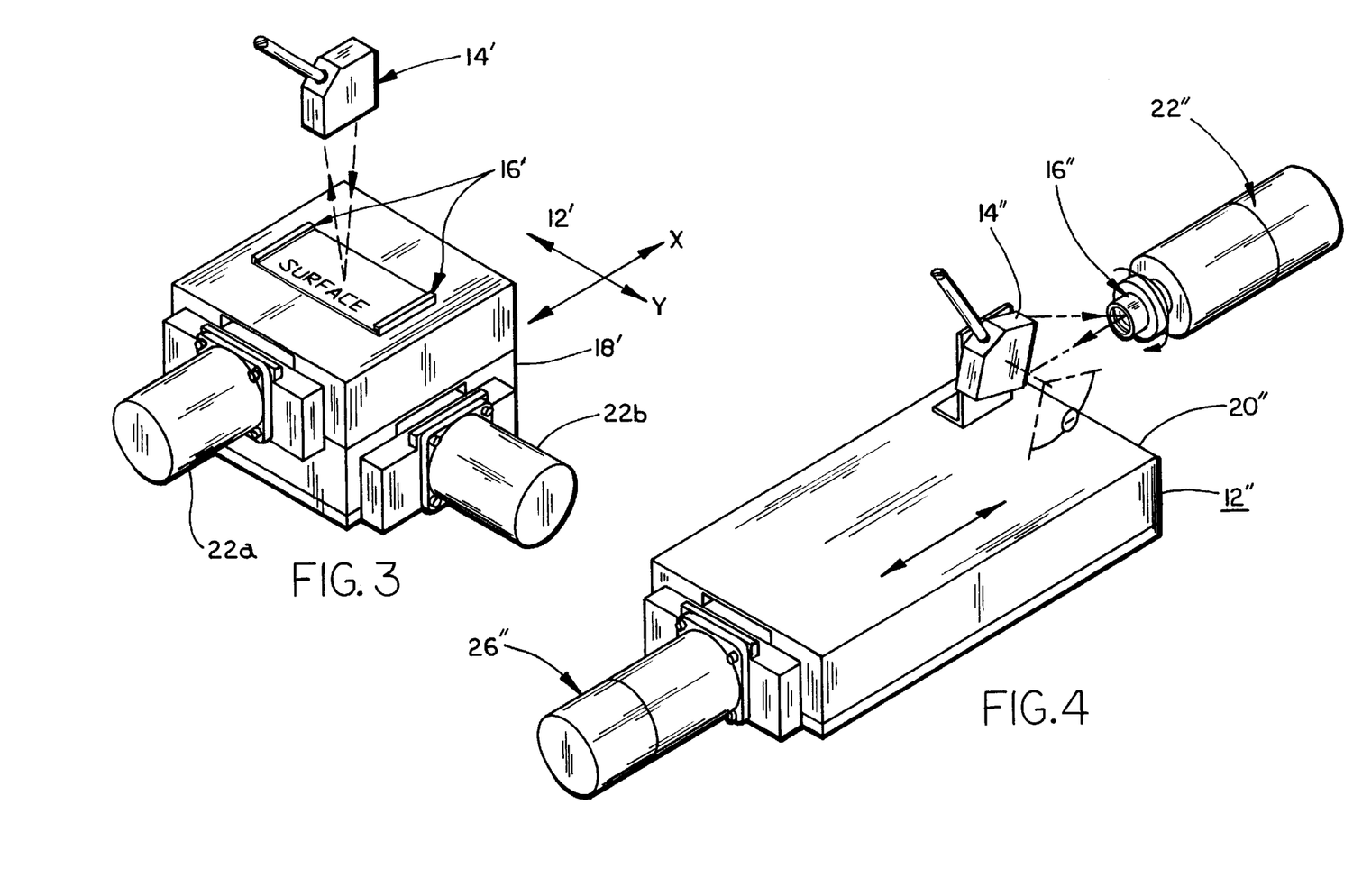
FIG. 3 is a perspective view of a transporter system for causing relative motion between a sensor and an object.
FIG. 4 is the same view as FIG. 3 of an alternative embodiment of the invention.

FIG. 3 illustrates a transport system 12' which is suitable for performing inspection on a flat surface object 16'. Transport system 12' includes a transporter 18' for selectively moving object 16' including a first transport actuator 22a for moving the object in a first direction X and a second transport actuator 22 for moving object 16' in an axis Y which is normal to axis X. In such embodiment, a sensor 14' is stationary and object 16' is moved with respect to the sensor in order to obtain relative motion between the sensor and the object to be inspected.

In an embodiment illustrated in FIG. 4, a transporter system 12" includes a transporter 20 which translates a sensor 14" along a single axis, by a transport actuator 26", toward and away from an object 16", which, in the illustrated embodiment, is a cylindrical part having critical internal features, or characteristics, such as threads and the like. An object transport actuator 22" rotates object 16" concurrently with actuator controller 28" translating the sensor. In this manner, a more complex motion is created between the sensor and the part.

Figure 5:
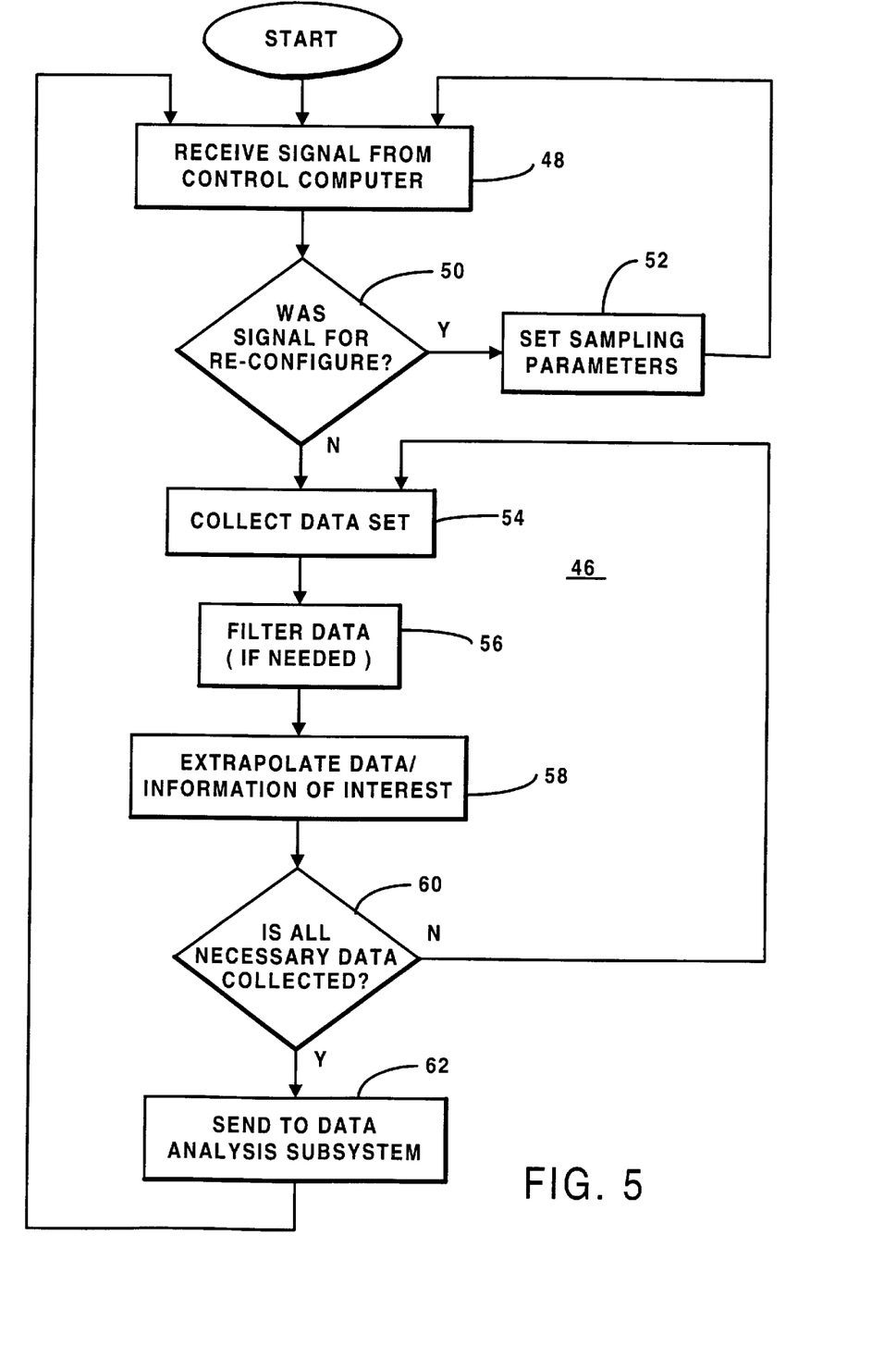
FIG. 5 is a flowchart of a data collection process.

In order to inspect an object, a data acquisition routine 46 begins by receiving a signal at 48 from data analysis subsystem 34, which is evaluated at 50 to determine whether the signal was to reconfigure the apparatus to analyze a different object (FIG. 5). If so, then the sampling parameters for the new object are set at 52 and the data acquisition subsystem 30 awaits a further command from the data analysis subsystem (48). When it is determined (50) that the signal was not to reconfigure the measurement apparatus, a first set of data is collected (54). The data set is filtered (56) in order to remove noise or unwanted data from various sources as is well understood by the skilled artisan. The filtered data is then manipulated, in a manner that will be explained in more detail below, at 58 in order to extract information of interest. The information of interest relates to particular surface features of the object being inspected. It is then determined (60) whether all data has been collected for the particular process. It should be understood that, for particularly applications, the data is collected for an entire object to be inspected and analyzed after all the data is collected. In other applications, data is more frequently passed to the data analysis subsystem in order to provide real-time data analysis. If it is determined (60) that there is additional data to be collected, the routine returns to 54 to collect additional data. If it is determined at 60 that all necessary data has been collected for the process, all remaining data is sent to the analysis subsystem (62). The routine then returns to 48 in order to await additional commands from data analysis subsystem 34.

Figure 6:
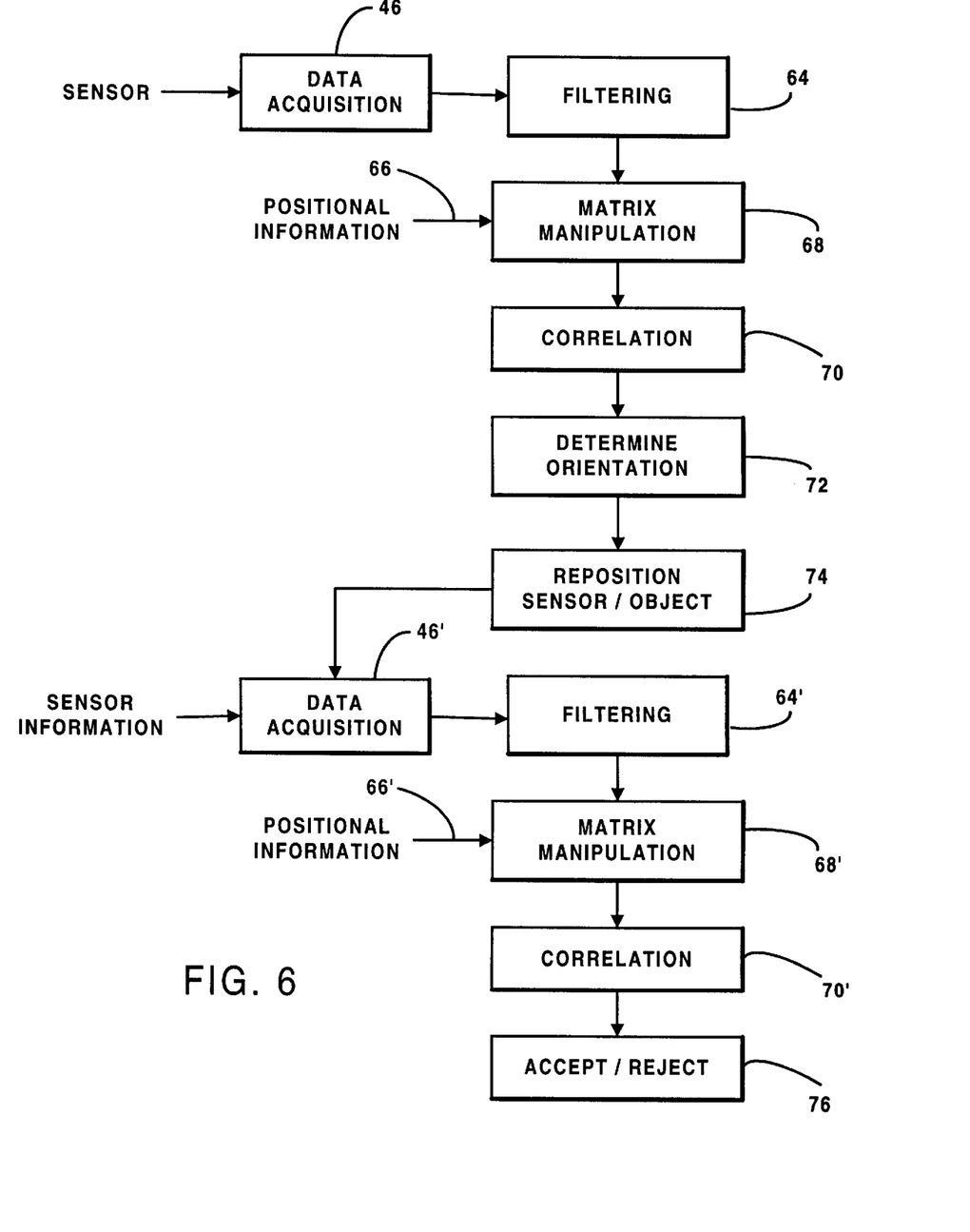
FIG. 6 is a flowchart of a method of measuring a surface characteristic of an object according to the invention.

After data has been acquired by data acquisition routine 46, the data is again filtered at 64 to remove noise and is combined with positional information 66 at 68 (FIG. 6). The positional information is provided from motion controller 24, 28 over the respective communication subsystems 36, 38. The positional information is combined with the acquired data in a multi-dimensional matrix at 68. The matrix has one dimension made up of the number of samples made at each position on the object and at least one other matrix dimension being a definition of the position on the object. The position relative to the object may be defined by actual surface coordinates or may be mathematically defined by an equation related to the contour of the surface configuration of the object. The assemble matrix is manipulated at 68 in order to identify features of interest to the further analysis. This matrix manipulation may include performing minimal/maximum value calculations, slope-of-data calculations, integration to obtain an area under a curve, zero-crossings, and other techniques known in the art. The particular technique utilized is application dependent and is for the purpose of identifying one or more specific surface details. After the matrix manipulation (68), the extracted data is correlated, or compared, (70) to data of a known object, which was obtained by means, such as by empirically measuring a known acceptable part or by extracting information from a drawing of the part or the like. This results in a determination of the orientation of the object with respect to the sensor at 72 from identification of the position of one or more surface details. For example, thread orientation of object 16" may be established from the correlation (70) and used to determine the orientation of object 16" (72). Likewise, the correlation step 70 may determine the relationship between sensor 14' and object 16' from identification of an edge of the object relative to the sensor. After the orientation is determined (72), the object is repositioned at 74 with respect to the sensor. This is accomplished by manipulation of transporter 18, 18', 20, or 20", or a combination of manipulations.

After the part has been oriented (46–74), an additional cycle of data acquisition (46'), filtering (64'), and matrix manipulation (68') results in a set of data that represents surface features of the object. A correlation is carried out at 70' in order to determine defects in the surface of interest of the object by determining the deviation from the data which represents an acceptable object. Such deviation may be accomplished by matrix subtraction or other mathematical manipulation. As a result of the correlation (70'), the object is either accepted or rejected at 76. In addition to performing matrix manipulation in software, data analysis subsystem 34 may utilize dedicated software such as a DSP circuit or the like to analyze the data.

The method and apparatus disclosed herein utilizes motion between the object and the sensor in order to provide multi-dimensional representation of the surface to thereby map details of the surface. This allows the data extracted in this manner to be processed in order to determine defects in the object. By identifying particular surface features of the object utilizing matrix manipulation or other mathematical processing, deviations in the data set resulting from color differences in the object surface, as well as other variables of the object, are eliminated. This is particularly important in the inspection of objects which are either multi-colored or which vary in color from part-to-part.

In the illustrated embodiment, sensor 12 is an MQ series or an LM series triangulation laser marketed by Matsushta under the brand name Aromat. Other non-contact sensors may be utilized, including sonic sensors, CCD pixel arrays, analog proximity sensors, and the like. Because of the parallel nature of measurement apparatus 10, the apparatus may be readily reconfigured in order to accommodate different types of parts.

Figures 7, 8:
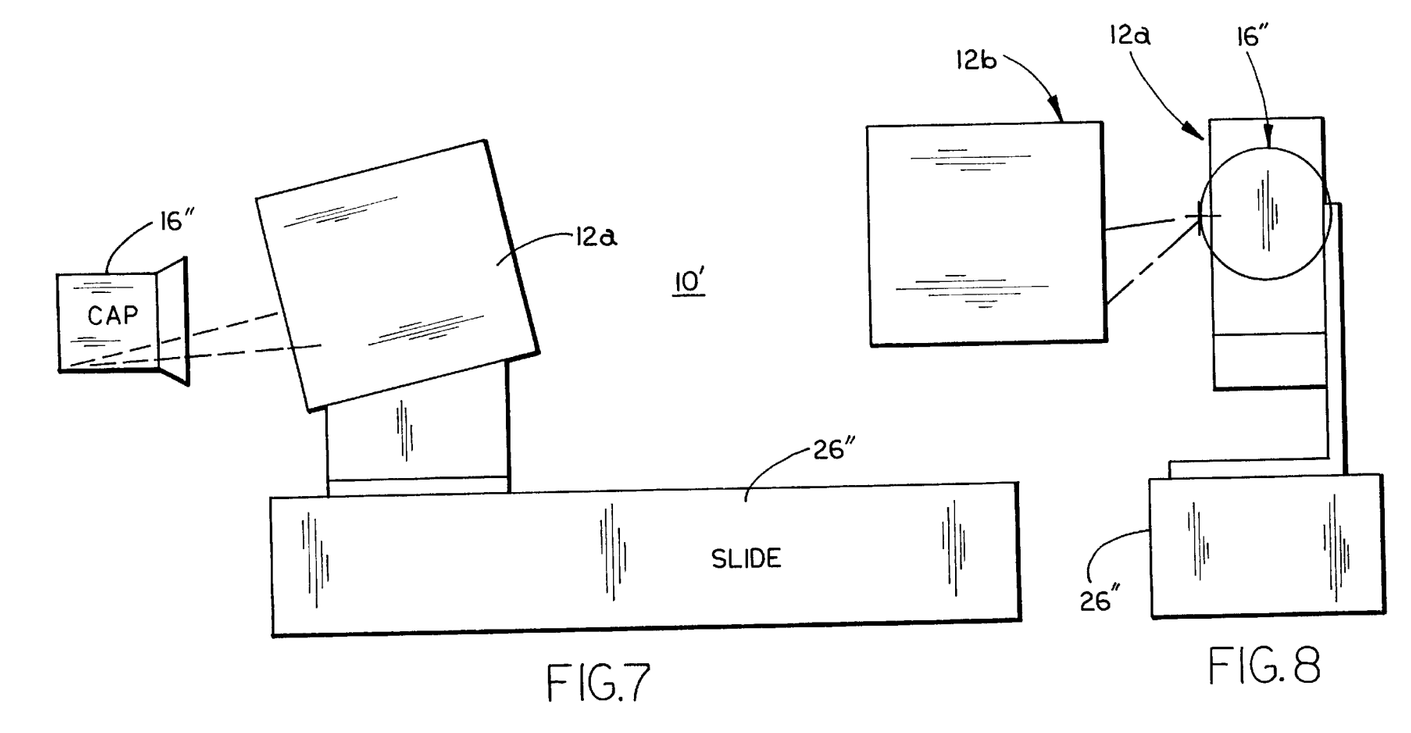
FIG. 7 is a side elevation of an alternative embodiment utilizing multiple sensors.
FIG. 8 is an end view of the apparatus in FIG. 7.

A measuring apparatus 10' is illustrated utilizing a pair of sensors 12a and 12b (FIGS. 7 and 8). As transport actuator 26" is translated toward and away from object 16", which is rotated by transport actuator 22" (not shown) in FIG. 7, sensor 12a measures surface characteristics of interior surfaces of object 16" while object sensor 12b measures surface characteristics of the exterior surface of object 16". This is particularly important for objects, such as bottle caps and the like, having both internal and external surface configurations that are significantly different from each other and are of importance to proper functioning of the object.

An apparatus according to the invention has been successfully demonstrated to provide accurate and thorough inspection of both external and internal surfaces of objects having internal threads in a cycle time of less than six (6) seconds. This success followed several failed attempts to accomplish these results using other techniques. Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A high speed method of accepting and rejecting an object by identifying specific three-dimensional surface features of interest of an object, including:

providing at least two sensors configured to make measurements of opposite surfaces of a common wall;

creating relative motion between said sensor and the object while repetitively making measurements of surface characteristics in order to create a data set wherein said data set includes a plurality of measurements made at each position on the object and positional data;

extracting from said data set a subset of data that represents surface features of interest of the object by mathematically manipulating said data set to identify three-dimensional surface features of interest of the object on each of said opposite surfaces;

providing a set of relevant surface feature data and a limit of deviation from the surface feature data which represents an acceptable object;

correlating said subset of data that represents surface features of interest of the object with said set of relevant surface feature data in order to determine an amount of deviation of the measured features of interest from the relevant surface feature data; and accepting or rejecting said object in response to said correlating the specified tolerance by determining whether the amount of deviation is within the provided limit.

2. A high speed non-contact inspection apparatus, comprising:

at least two sensors configured to measure characteristics of opposite surfaces of a common wall;

a transporter system for causing relative motion between said at least two sensors and an object;

a high speed data acquisition system for making multiple readings from said at least two sensors at each of multiple locations on an object in order to provide surface characteristic data; and a data analysis system which receives said surface characteristics data from said data acquisition system and positional data from said transporter and mathematically processes said surface characteristic data and said positional data into three-dimensional surface feature data which represents surface features of the object; and wherein said data analysis system correlates said surface feature data with data representative of ideal surface features of an object in order to determine an amount of deviation of the measured surface feature data from the data representative of ideal surface features and accepts or rejects the object by determining whether the amount of deviation is within a provided limit.

3. The method of claim 1 including identifying an orientation of said object and reorienting said object in response to said identifying prior to said steps of creating, extracting, correlating and accepting or rejecting.

4. The method of claim 3 wherein said identifying an orientation includes performing said steps of creating, extracting, providing and correlating in order to identify whether the amount of deviation from the relevant surface feature data of a particular surface feature of the object which correlates with the orientation of the object is within a provided limit.

5. The method of claim 1 wherein said mathematically manipulating includes creating an n-by-m matrix and processing said matrix to obtain said surface features of interest, where n is the number of measurements made at each position and where m is the number of positions.

6. The method of claim 1 wherein said step of creating relative motion includes moving the object in at least two independent coordinates.

7. The method of claim 1 wherein said step of creating relative motion includes rotating the object about an axis.

8. The method of claim 7 wherein said step of creating relative motion further includes moving the sensor along said axis.

9. The apparatus in claim 2 wherein said transporter system, said data acquisition system, and said data analysis system each include a controller for substantially independent control of the associated system.

10. The apparatus in claim 2 wherein said transporter system is responsive to said data analysis system for establishing a particular orientation of the object.

11. The apparatus in claim 10 wherein said transporter system reorients the object after initial identification of particular surface features of the object.

12. The apparatus is claim 2 wherein said transporter system transports the object.

13. The apparatus in claim 12 wherein said transporter system transports the object in at least two independent axes.

14. The apparatus in claim 12 wherein said transporter system rotates the object about an axis.

15. The apparatus in claim 14 wherein said transporter system further transports the sensor along said axis.

16. The apparatus in claim 2 wherein said data analysis system mathematically processes said surface characteristic data and said positional data by creating an n-by-m matrix, where n is the reading at each location and m is the location, and processing said matrix to obtain said surface character data.

17. The method of claim 1 wherein said step of creating relative motion includes rotating the object about an axis.

18. The method of claim 1 wherein one of said surfaces defines threads.

19. The method of claim 18 wherein said threads are internal threads.

20. The method of claim 1 wherein the surface features of interest are identified on non-planar surfaces.

21. The method of claim 4 wherein the surface features of interest which correlate with the orientation of the object are identified on non-planar surfaces.

* * * * *